(12) United States Patent
Yoshihisa

(10) Patent No.: US 7,327,115 B2
(45) Date of Patent: Feb. 5, 2008

(54) STEPPING MOTOR CONTROL APPARATUS, STEPPING MOTOR CONTROL METHOD, AND STEPPING MOTOR CONTROL PROGRAM PRODUCT

(75) Inventor: Yasuhiko Yoshihisa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/368,526

(22) Filed: Mar. 7, 2006

(65) Prior Publication Data
US 2006/0255760 A1 Nov. 16, 2006

(30) Foreign Application Priority Data
Mar. 7, 2005 (JP) ............................ P2005-062026

(51) Int. Cl.
H02P 8/00 (2006.01)

(52) U.S. Cl. .................. 318/696; 318/685; 318/801; 318/782; 318/471; 388/934

(58) Field of Classification Search ................ 318/696, 318/685, 801, 782, 471; 388/934
See application file for complete search history.

(56) References Cited

U.S. PATENT DOCUMENTS

2004/0109236 A1* 6/2004 Nishioka .................... 359/643

FOREIGN PATENT DOCUMENTS

| JP | 5-219792 A | 8/1993 |
| JP | 6-38544 A | 2/1994 |
| JP | 6-71586 A | 3/1994 |
| JP | 8-51789 A | 2/1996 |
| JP | 2002-281788 A | 9/2002 |

* cited by examiner

Primary Examiner—Karen Masih
(74) Attorney, Agent, or Firm—Sughrue Mion, PLLC

(57) ABSTRACT

There are included a control circuit to control sequence of excitation of a stepping motor, a switching circuit to switch electric power to be supplied to the stepping motor based on an instruction from the control circuit, and a stop circuit to stop an operation of the switching circuit in a case where temperature of the switching circuit becomes a specified temperature or higher, and the control circuit controls the switching circuit in a mode where the stop circuit operates before the stepping motor is damaged by heat.

15 Claims, 12 Drawing Sheets

FIG. 8A
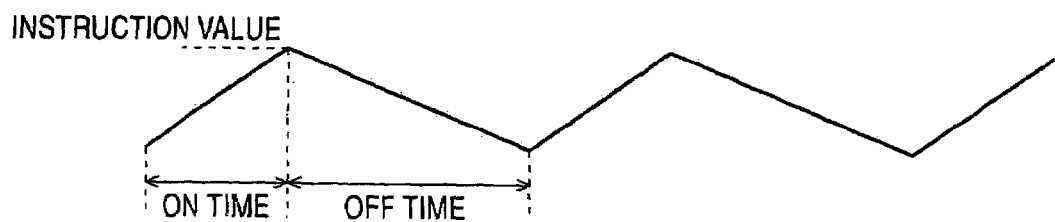
FIG. 8B
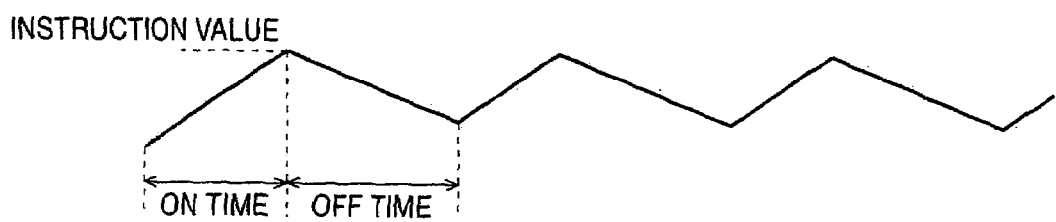
FIG. 9
| CURRENT SET VALUE | DECAY | OFF TIME |
|---|---|---|
| 100% | FAST | 35μs |
|  | SLOW | 30μs |
| 60% | FAST | 25μs |
|  | SLOW | 20μs |
| 20% | FAST | 15μs |
|  | SLOW | 10μs |
| 0% | FAST | – |
|  | SLOW | – |

STEPPING MOTOR CONTROL APPARATUS, STEPPING MOTOR CONTROL METHOD, AND STEPPING MOTOR CONTROL PROGRAM PRODUCT

BACKGROUND OF THE INVENTION

1. Technical Field of the Invention

The present invention relates to a stepping motor control apparatus, a stepping motor control method and a stepping motor control program product.

2. Description of the Related Art

A conventional stepping motor control apparatus generally adopts such a method that reference is made to a table indicating a relation between the position of a rotator of a stepping motor and the phase of excitation, the excitation current corresponding to the position of the rotator is made to flow, and the rotator is rotated to a desired angle (see JP-A-2002-281788 (Abstract, Claims)).

In the conventional stepping motor control apparatus, in the case where for example, a program for control runs away, since current continues to be supplied to the stepping motor, there is a problem that the stepping motor is heated and is burnt out in some cases.

SUMMARY OF THE INVENTION

The invention has been made in view of the above circumstances, and has an object to provide a stepping motor control apparatus, a stepping motor control method, and a stepping motor control program product, in which even in the case where a program or the like runs away, it is possible to prevent a stepping motor from being burnt out.

In order to achieve the foregoing object, according to an aspect of the invention, a stepping motor control apparatus includes a control circuit to control sequence of excitation of a stepping motor, a switching circuit to switch electric power to be supplied to the stepping motor based on an instruction from the control circuit, and a stop circuit to stop an operation of the switching circuit in a case where temperature of the switching circuit becomes a specified temperature or higher, and the control circuit controls the switching circuit in a mode where the stop circuit operates before the stepping motor is damaged by heat.

Accordingly, the stepping motor control apparatus can be provided which can prevent the stepping motor from being burnt out even in the case where a program or the like runs away.

Besides, according to a stepping motor control apparatus of another aspect of the invention, in addition to the foregoing invention, the control circuit adjusts an off time as a time in which a switch constituting the switching circuit keeps an off state and controls the switching circuit in the mode where the stop circuit operates before the stepping motor is damaged by heat Thus, by adjusting the off time, it is possible to easily prevent the stepping motor from being damaged by heat Besides, according to a stepping motor control apparatus of another aspect of the invention, in addition to the foregoing invention, the control circuit adjusts the off time in accordance with a set value of current to be outputted to the stepping motor. Thus, irrespective of the set current value, it is possible to always stably prevent the stepping motor from being burnt out by heat.

Beside, according to a stopping motor control apparatus of another aspect of the invention, in addition to the foregoing invention, the control circuit adjusts the off time according to a kind of decay of the switching circuit. Thus, irrespective of the kind of the decay, it is possible to certainly prevent the stepping motor from being damaged by heat.

Besides, according to another aspect of the invention, a stepping motor control method is a control method for a stepping motor control apparatus including a control circuit to control sequence of excitation of a stepping motor, a switching circuit to switch electric power to be supplied to the stepping motor based on an instruction from the control circuit, and a stop circuit to stop an operation of the switching circuit in a case where temperature of the switching circuit becomes a specified temperature or higher, and the control circuit controls the switching circuit in a mode where the stop circuit operates before the stepping motor is damaged by heat.

Accordingly, the stepping motor control method can be provided which can prevent the stepping motor from being burnt out even in the case where a program or the like runs away.

Besides, according to another aspect of the invention, a stepping motor control program is a control program for a stepping motor control apparatus including a control circuit to control sequence of excitation of a stepping motor, a switching circuit to switch electric power to be supplied to the stepping motor based on an instruction from the control circuit, and a stop circuit to stop an operation of the switching circuit in a case where temperature of the switching circuit becomes a specified temperature or higher, and the switching circuit is controlled in a mode where the stop circuit operates before the stepping motor is damaged by heat.

Accordingly, the stepping motor control program can be provided which can prevent the stepping motor from being burnt out oven in the case where a program or the like runs away.

BRIEF DESCRIPTION OF THE DRAWINGS

FIGS. 8A and 8B are views each explaining an off time and an on time of the drive circuit shown in FIG. 6;

FIG. 9 is a view showing a relation among a current set value, a decay and an off time;

DETAILED DESCRIPTION OF THE INVENTION

Hereinafter, an embodiment of the invention will be described with reference to the drawings.

Figure 1:
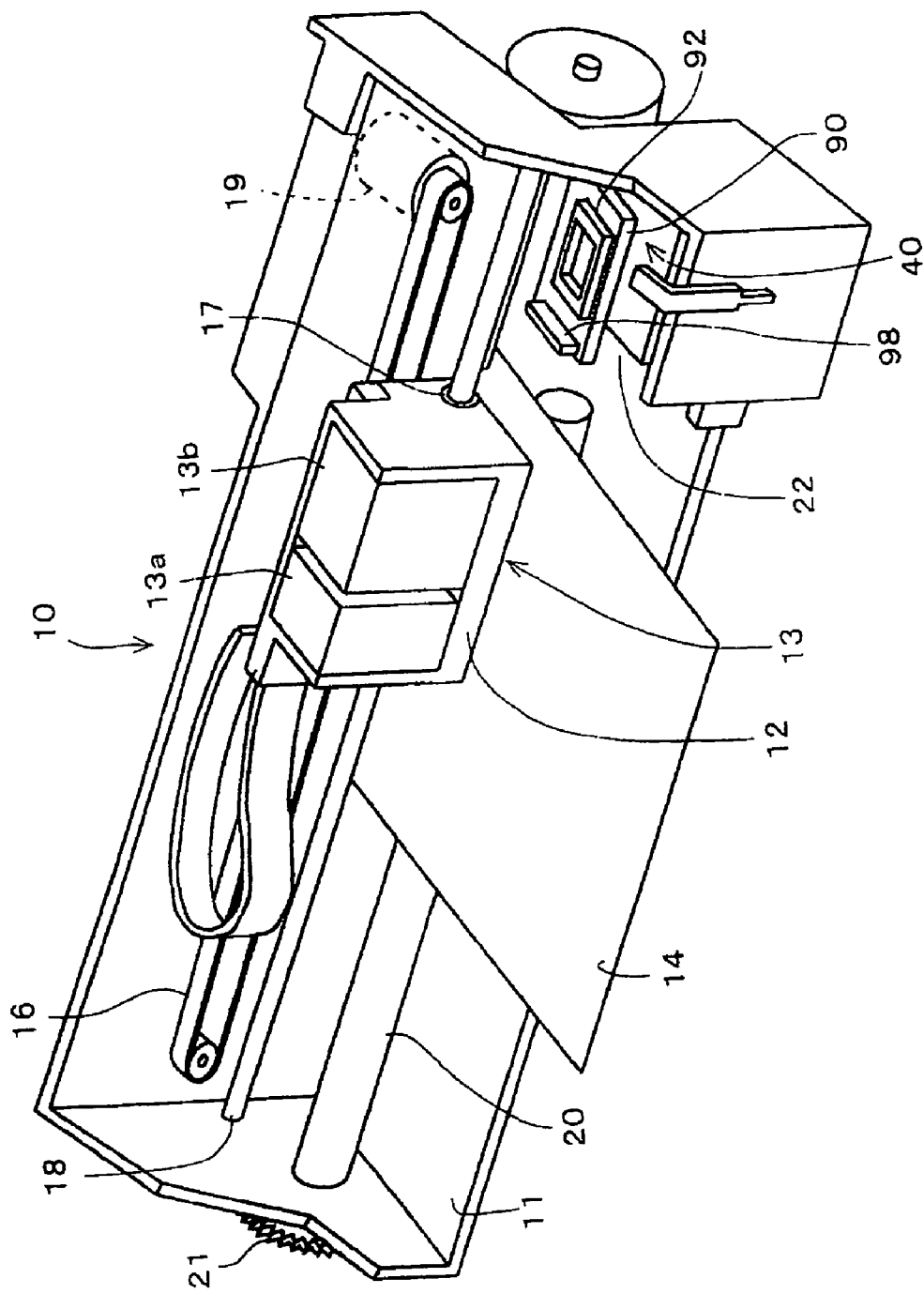
FIG. 1 is a view showing a structural example of a printing apparatus of an embodiment of the invention.

FIG. 1 is a view showing a structural example of a printing apparatus using a stopping motor control apparatus of an embodiment of the invention. Hereinafter, the embodiment of the invention will be described with reference to FIGS. 1 to 9. FIG. 1 is a perspective view showing the basic structure of a printing apparatus 10 of this embodiment As shown in FIG. 1, the printing apparatus 10 includes a base 11, and a carriage 12 is constructed to freely reciprocate with respect to the base 11.

The carriage 12 constitutes an ink-jet recording head body 13, and can mount therein a cartridge 13a for black ink and a cartridge 13b for yellow, cyan and magenta. A recording head 15 is provided below the carriage 12 so as to be opposed to a recording sheet 14. A lower end face of the recording head 15 is a nozzle formation face 15a, and can discharge ink.

A part of a timing belt 16 is fixed to this carriage 12. An insertion hole 17 is formed in the carriage 12, and a long guide shaft 18 can be inserted through this insertion hole 17. Thus, when a carriage motor 19 is rotated, the timing belt 16 is driven, and the carriage 12 is moved along the guide shaft 18 by the driving of this timing belt 16.

A roller member 20 is rotatably provided on a lower side of the inside of the base 11. The roller member 20 is provided to be rotatable by a gear train 21 existing on the other end side of the base 11. The recording sheet 14 supplied to the printing apparatus 10 is moved in the sub-scanning direction of the recording head 15 by the rotation of the roller member 20. In order to rotation-drive the roller member 20, a not-shown paper feed motor is provided on the other end side of the inside of the base 11.

Here, the roller member 20 is provided only in a region (printing region) where printing is performed to the maximum in the inside of the base 11. A non-printing region where the roller member 20 is not provided in the inside of the base 11 is a home position where an after-mentioned cap unit 40 is provided.

Figure 2:
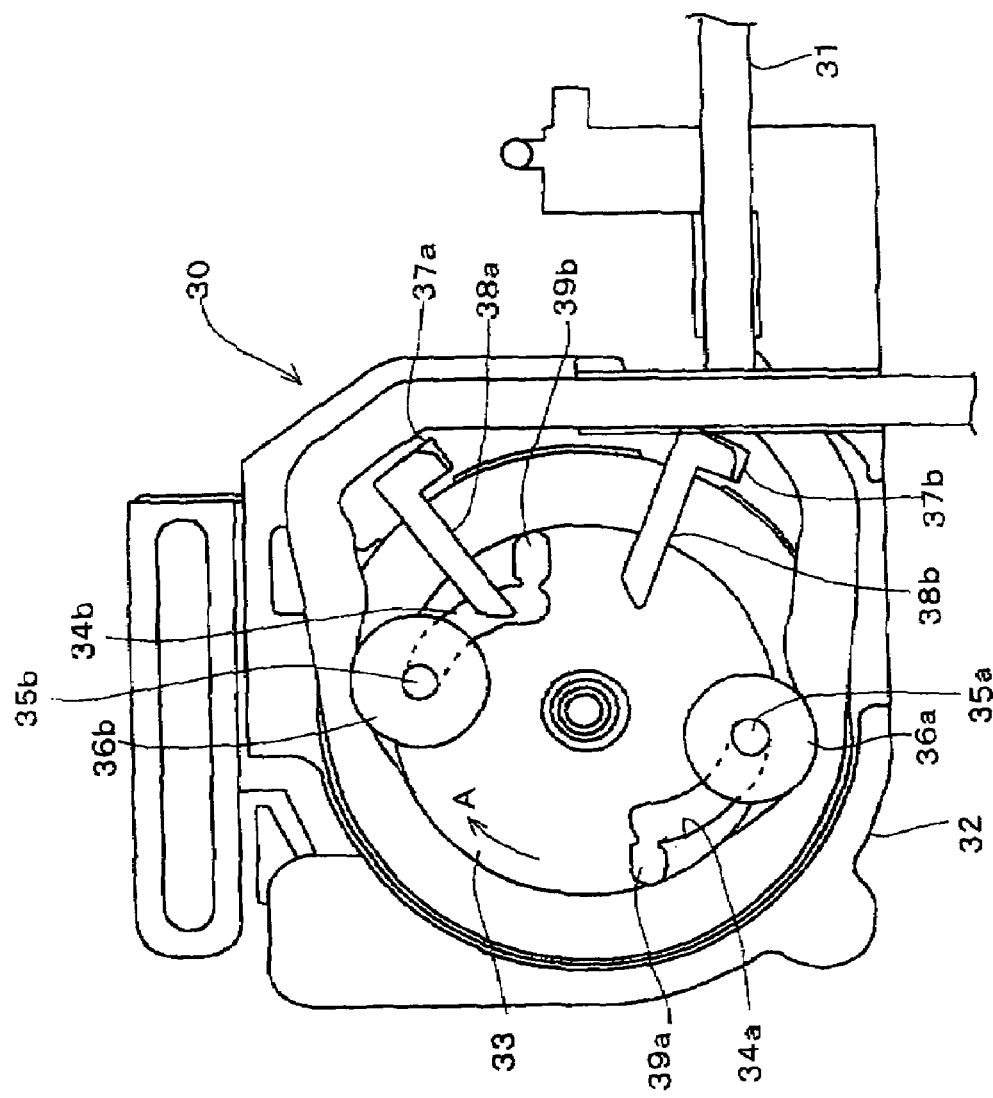
FIG. 2 is a view showing a structural example of a tube pump of the printing apparatus shown in FIG. 1.
Figure 3:
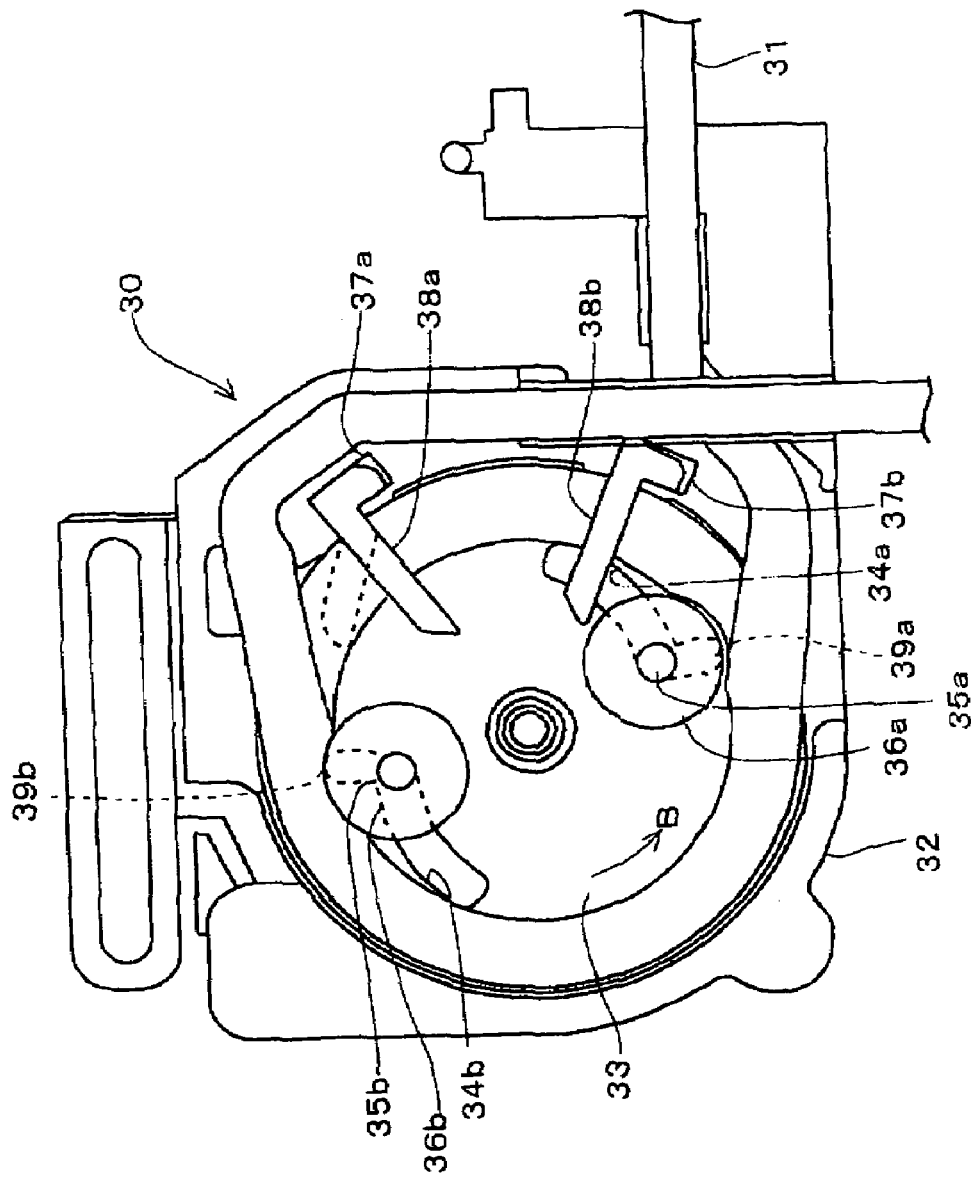
FIG. 3 is a view showing a structural example of the tube pump of the printing apparatus shown in FIG. 1.

On the bottom side of the base 11 in the home position 22, a tube pump 30 as a suction pump as shown in FIG. 2 and FIG. 3 is provided. The tube pump 30 includes a pump frame 32 whose plane shape is an arc, and a flexible tube 31 is disposed along the inside surface of the pump frame 32. Its one end (right end in the drawing) is connected to a not-shown connection pipe of a cap head 90, and the other end (lower end of the drawing) is connected to a not-shown waste liquid tank.

Roller support grooves 34a and 34b are provided in a pump wheel 33 of the tube pump 30. Roller support shaft 35a and 35b are inserted therein, and hold support rollers 36a and 36b rotatably and movably. Insertion openings 39a and 39b are provided at ends of the roller support grooves 34a and 34b, and the roller support shafts 35a 35b are inserted from the portions at the time of assembly. Engagement grooves 37a and 37b each recessed in a substantially L shape are formed in part of the pump frame 32, and guide members 38a and 38b formed of elastic member are fitted therein. The tube pump 30 as stated above performs a suction operation when the pump wheel 33 is driven by an after-mentioned stepping motor 121.

As shown in FIG. 2, when the pump wheel 33 is driven in the clockwise direction (direction of an arrow A), since the guide members 38a and 38b press the rollers 36a and 36b in the counterclockwise direction, the rollers 36a and 36b moves to the ends opposite to the insertion openings 39a and 39b of the roller support grooves 34a and 34b. Here, since the diameters of the roller support grooves 34a and 34b become large toward the direction opposite to the insertion openings 39a and 39b, the rollers 36a and 36b move toward the outside. As a result since the rollers 36a and 36b rotate while pressing the flexible tube 31 toward the outside, the liquid and gas in the inside of the flexible tube 31 are moved in the direction of the arrow A. As a result, the ink is moved from the cap head 90 to the waste liquid tank.

As shown in FIG. 3, when the pump wheel 33 is driven in the counterclockwise direction (direction of an arrow B), since the guide members 38a and 38b press the rollers 36a 36b in the clockwise direction, the rollers 36a and 36b move toward the insertion openings 39a and 39b of the roller support grooves 34a and 34b. As a result, the rollers 36a and 36b move toward the inside, and there occurs a state where the rollers 36a and 36b are in slight contact with the flexible tube 31. Thus, by keeping this state, it is possible to prevent the inner walls of the flexible tube 31 from adhering to each other.

Figure 4:
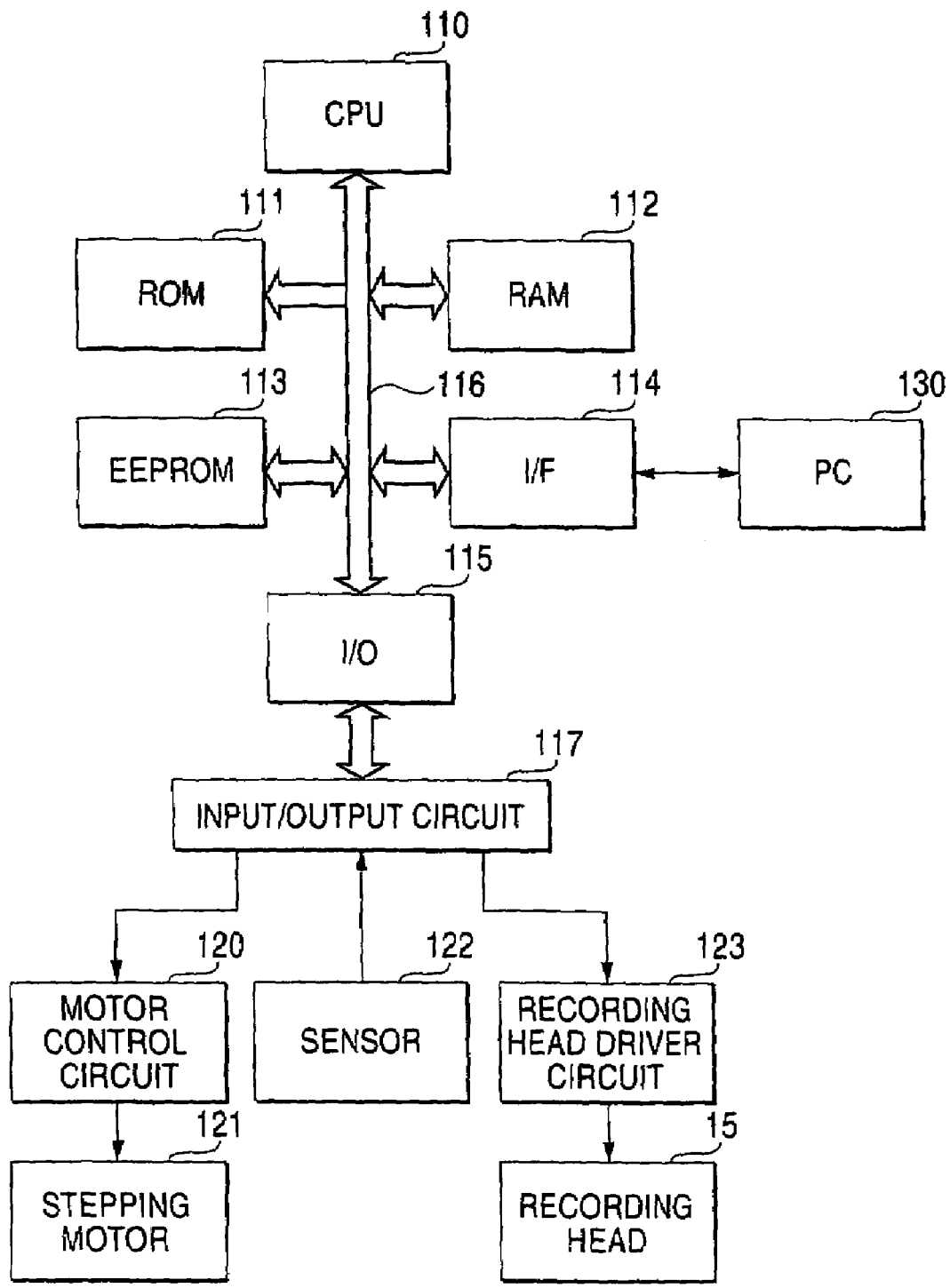
FIG. 4 is a view showing a structural example of a control system of the printing apparatus shown in FIG. 1.

Next, a control system of the printing apparatus shown in FIG. 1 will be described. FIG. 4 is a block diagram showing the control system of the printing apparatus shown in FIG. 1. As shown in this drawing, the control system of the printing apparatus includes a CPU (Central Processing Unit) 110, a ROM (Read Only Memory) 111, a RAM (Random Access Memory) 112, an EEPROM (Electrically Erasable and Programmable ROM) 113, an I/F (Interface) 114, an I/O (Input and Output) 115, a bus 116, an input/output circuit 117, a motor control circuit 120, a stepping motor 121, a sensor 122, a recording head driver circuit 123, and a recording head 115. A personal computer (PC) is connected to the I/F 114.

Here, the CPU 110 performs various arithmetic processings according to programs stored in the ROM 111 and the EEPROM 113, and controls the respective parts of the apparatus including the stepping motor 121.

The ROM 111 is a semiconductor memory storing various programs and various data to be executed by the CPU 110.

The RAM 112 is a semiconductor memory to temporarily store programs and data which become execution objects of the CPU 110.

The EEPROM 113 is a semiconductor memory in which specified data of results of the arithmetic processing of the CPU 110 are stored and the data is held even after the power supply of the printing apparatus is cut off.

The I/F 114 is a device to suitably transform a representation format of data when information is given to and received from the personal computer 130.

The bus 116 is a signal line group to mutually connect the CPU 110, the ROM 111, the RAM 112, the EEPROM 113, the I/F 114 and the I/O 115 and to enable information to be given and received among them.

The motor control circuit 120 includes a logic circuit and a drive circuit as described later, and controls the stepping motor 121 according to the control of the CPU 110.

The stepping motor 121 is constructed of, for example, a two-phase stepping motor, and drives the tube pump 30 shown in FIG. 2 and FIG. 3 according to the control of the motor control circuit 120.

Incidentally, in the example shown in FIG. 4, although only the stepping motor 121 to drive the tube pump 30 is shown, actually, a not-shown stepping motor to drive the roller member 20, and a stepping motor (carriage motor 19)

to drive the carriage 12 in the main scanning direction are also controlled by a control circuit similar to the motor control circuit 120.

The sensor 122 includes, for example, a recording sheet sensor, an ink remaining amount sensor, an accumulated working time sensor and the like, detects various states of the printing apparatus, and outputs them to the I/O 115 through the input/output circuit 117.

The recording head driver circuit 123 is connected to the recording head 15 and is a driver to perform control for discharging ink. As described before, the recording head 15 discharges inks of various colors from plural nozzles according to the control of the recording head driver circuit 123, and prints a desired image and character on the recording sheet 14.

Figure 5:
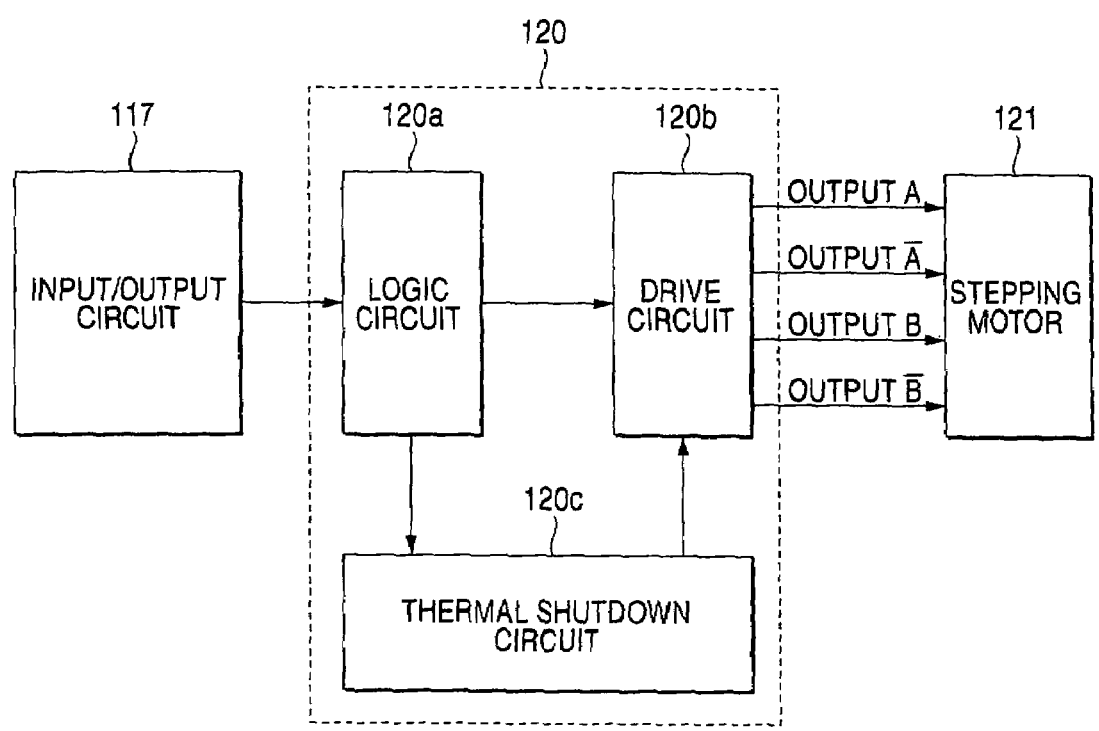
FIG. 5 is a view showing a detailed structural example of a motor control circuit shown in FIG. 4.

FIG. 5 is view showing a detailed structural example of the motor control circuit 120. As shown in this figure, the motor control circuit 120 includes, as main components, a logic circuit 120a, a drive circuit 120b, and a thermal shutdown circuit 120c.

Here, the logic circuit 120a as the control circuit receives set data from the CPU 110 through the input/output circuit 117, sets the operation environment, and controls the drive circuit 120b according to the control data supplied from the CPU 110. The drive circuit 120b as a switching circuit switches electric power supplied from a not-shown power source based on the control of the logic circuit 120a, and drives the stepping motor 121.

More specifically, the motor control circuit 120 determines the current amount of chopping current to be outputted to the A-phase and B-phase based on the control data supplied from the CPU 110. Besides, the motor control circuit 120 sets the decay of the chopping current based on the control data supplied from the CPU 110. The decay indicates the regenerative method of current at the chopping off time, and includes a slow decay, a fast decay, and a mixed decay. The slow decay is a method in which a switching transistor is held in an on state, and the current is regenerated through the transistor. The fast decay is a method in which the transistor is brought into an off state, and the current is regenerated through a diode for regeneration. The mixed decay is a method in which these are mixed.

Figure 6A:
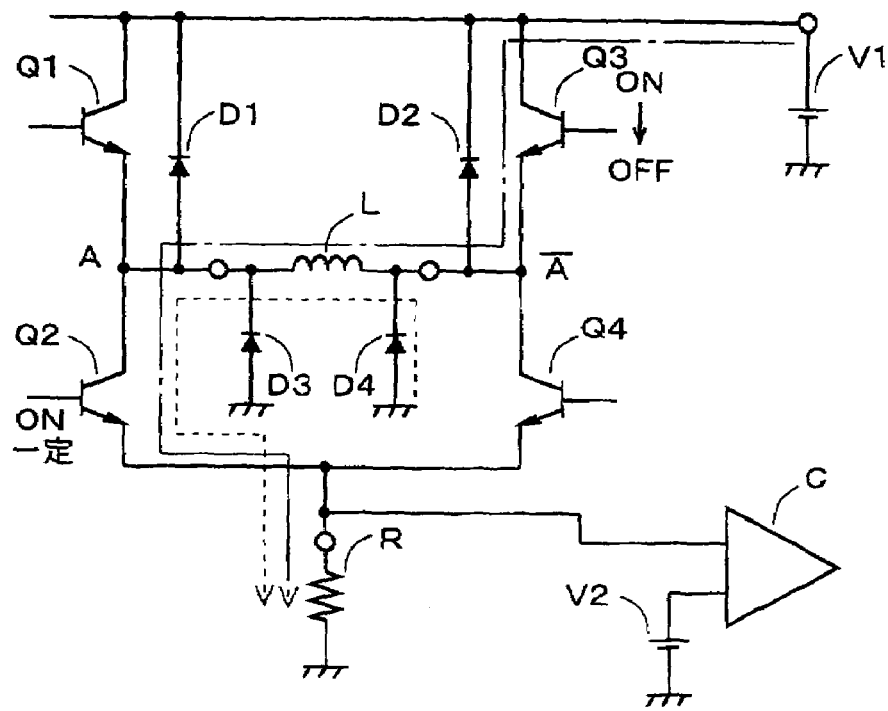
FIGS. 6A and 6B are views each showing a structural example of a drive circuit shown in FIG. 5.
Figure 6B:
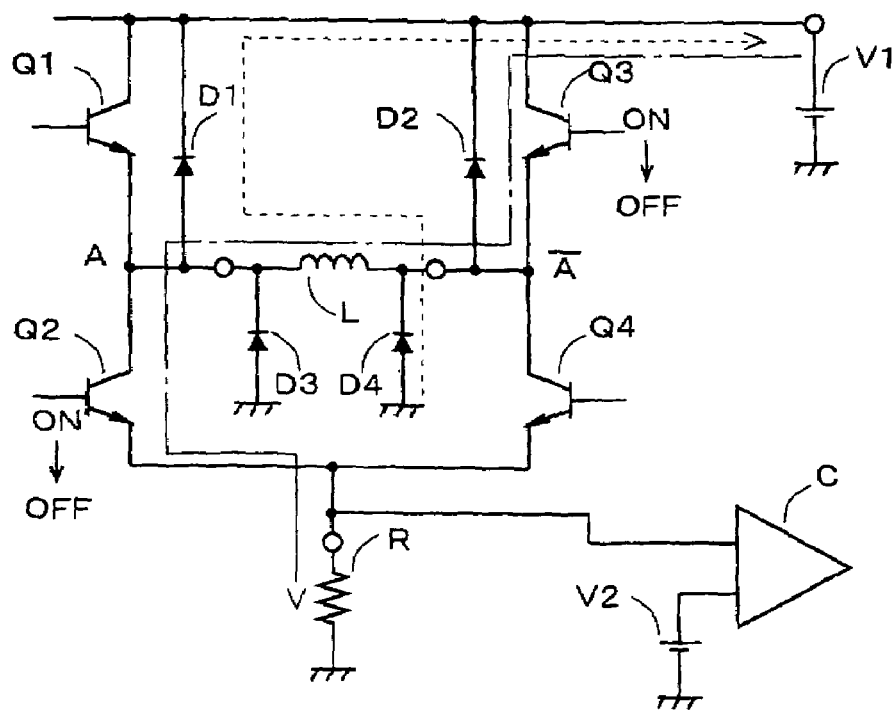

FIGS. 6A and 6B are views each explaining the details of the drive circuit 120b. FIG. 6A is a view for explaining the operation of the slow decay. Here, the drive circuit 120b includes, as main components, transistors Q1 to Q4, diodes D1 to D4, a coil L, a resistor R, a power source V1, a reference voltage source V2, and a comparator C. Here, the transistors Q1 to Q4 switch the current flowing to the coil L. The diodes D1 to D4 are diodes for a flywheel (regeneration). The coil L is a coil for excitation incorporated in the stepping motor 121. The power source V1 supplies power source electric power to the stepping motor 121. The resistor R is a resistor for detecting the current flowing to the coil L. The reference voltage source V2 supplies a reference voltage to the comparator C. The comparator C compares the current flowing to the coil L with the reference voltage, and outputs a signal according to its intensity.

Here, the operation in the case where the electric power is supplied to the coil L is the same in both the slow decay and the fast decay. As indicated by alternate long and short dash lines in FIGS. 6A and 6B, the transistors Q3 and Q2 are simultaneously brought into on states, and the electric power is supplied to the coil L through the transistor Q3, the coil L, the transistor Q2, and the resistor R.

In the case where the supply of the electric power to the coil L is stopped, in the slow decay, as shown in FIG. 6A, the transistor Q3 is brought into an off state, and the transistor Q2 keeps the on state. As a result, the regenerative current from the coil L flows through the diode D4, the transistor Q2, and the resistor R as indicated by a broken line.

On the other hand, in the case of the fast decay, when the supply of the electric power to the coil L is stopped, as shown in FIG. 6B, both the transistors Q3 and the transistor Q2 are brought into off states. As a result, the regenerative current from the coil L flows to the power source V1 through the diode D4 and the diode D1 as indicated by a broken line.

Figure 7A:
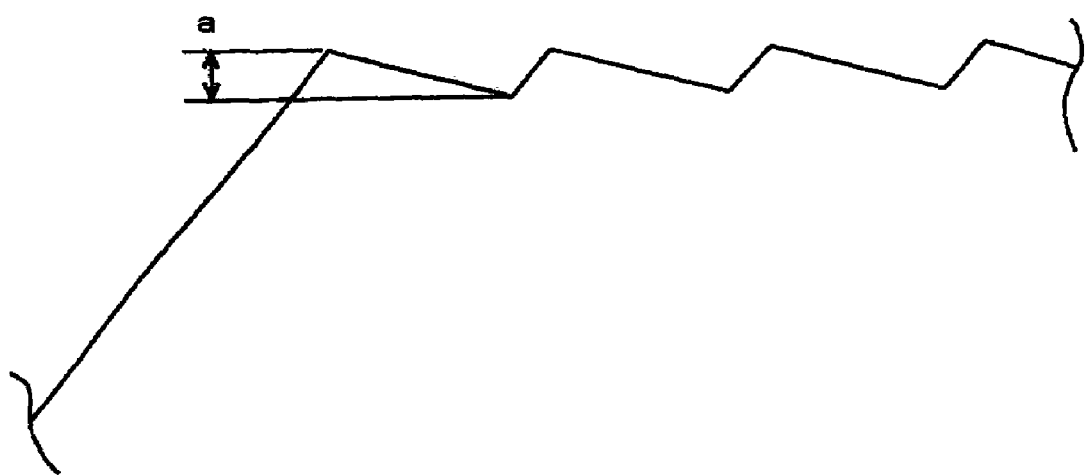
FIGS. 7A and 7B are views each showing an output current waveform of the drive circuit shown in FIG. 6.
Figure 7B:
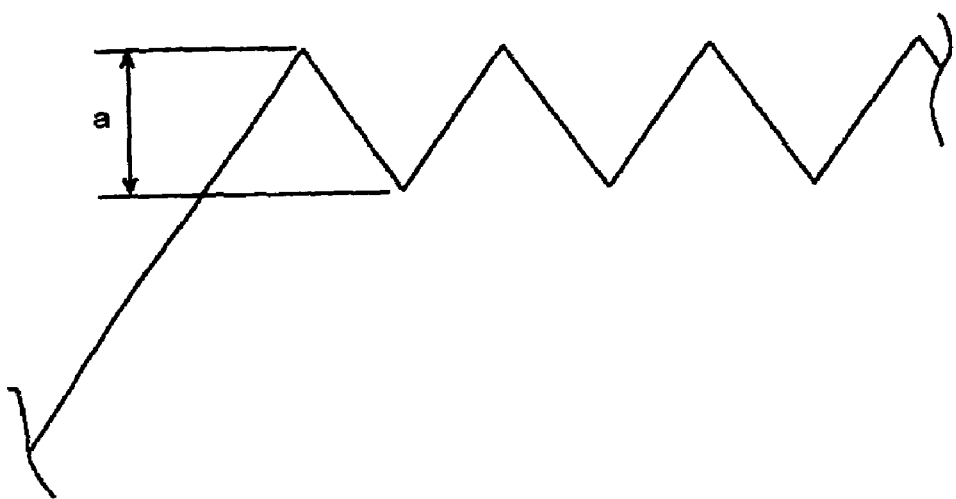

In the case of the slow decay, by the influence of the on resistor of the transistor Q2 and the resistor R, the decrease of the regenerative current becomes gentle as compared with the case of the fast decay. FIG. 7A shows the waveform of the current flowing to the coil L in the case of the slow decay. FIG. 7B shows the waveform of the current flowing to the coil L in the case of the fast decay. From the comparison of these figures, in the fast decay, the attenuation of the current is steep as compared with the slow decay. Besides, in the fast decay, as compared with the slow decay, a current amplitude "a" is large. From these, in the fast decay, since the current waveform is abruptly attenuated, as compared with the slow decay, the responsiveness of the control is high. However, since the current amplitude "a" is large, the operation-sound is large, and the loss is also large. The mixed decay in which the fast decay and the slow decay are combined has both of these features.

The motor control circuit 120 sets, based on the set data supplied from the CPU 110, an off time in which the transistor of the drive circuit 120b is in an off state. FIGS. 8A and 8B are views each explaining the off time. FIGS. 8A and 8B are views for explaining the operations of the cases where different off times are set. When the transistor is brought into the on state, the current flowing to the coil L is increased, and when the current reaches a current value determined by an instruction value, the transistor is brought into the off state, and the current is decreased. When the time set by the off time has passed, the transistor is again brought into the on state, and the operation similar to the foregoing case is repeated. The on time is determined by the inductance value of the coil L and the resistance value of the closed circuit. Accordingly, in the case where the off time is set to be short (in the case of FIG. 8B), the switching frequency becomes high. On the other hand, in the case where the off time is set to be long (in the case of FIG. 8A), the switching frequency becomes low.

Referring back to FIG. 5, the thermal shutdown circuit 120c as a stop circuit detects the temperature of the motor control circuit 120, and in the case where the detected temperature exceeds, for example, 140° C., the operation of the drive circuit 120b is stopped, and the motor control circuit 120 is protected. In the circuits constituting the motor control circuit 120, since the heat generation amount of the drive circuit 120b is largest, the thermal shutdown circuit 120c is disposed in the vicinity of the drive circuit 120b, and the heat of the portion may be detected.

Next, the operation of the above embodiment will be described.

In the case where the instruction of a specified process is issued from the personal computer 130, the CPU 110 controls the motor control circuit 120 based on the program stored in the ROM 111 as the need arises and drives the stepping motor 121.

For example, in the case where the instruction to drive the stepping motor 121 (for example, the instruction of a process to clean the recording head 15) is issued, the CPU 110 supplies the set data to the motor control circuit 120 and performs the setting. Specifically, the set data to select one of the fast decay and the slow decay shown in FIGS. 6A to 7B is sent, and the value of the output current flowing to the coil L is set. As the output current, a selection is made among, for example, 100%, 60% and 20%.

When the setting of the decay and the current value is ended, the CPU 110 sets the off time according to the current set value and the kind of the decay. FIG. 9 is a view showing a table storing a relation among the current set value, the kind of the decay and the off time. In this figure, the current set value indicates a percentage to the maximum value of current which can be made to flow to the drive circuit 120. The decay is one of the fast decay and the slow decay. As shown in FIGS. 8A and 8B, the off time is a time in which the transistor is continuously in the off state after the current reaches the instruction value. From the table shown in FIG. 9, for example, in the case where the current set value is 100%, when the decay is the fast decay, the set value of the off time is 35 μs. Incidentally, such information is stored in the ROM 111, and the CPU 110 reads it as the need arises, and supplies it to the motor control circuit 120.

The logic circuit 120a stores the current value supplied from the CPU 110, the kind of the decay, and the information indicating the time into a not-shown register, and controls the drive circuit 120b based on these stored values.

Here, the off time shown in FIG. 9 is determined from the viewpoint as described below. That is, in the case where the CPU 110 itself runs away by heat, or a program executed by the CPU 110 has, for example, a bug and runs away because of it, the stepping motor 121 is put in a state where electric power continues to be supplied. In the case as stated above, the stepping motor 121 generates heat, and is damaged by heat in some cases. Then, in this embodiment, the off time is adjusted, so that the thermal shutdown circuit 120c is operated before the stepping motor 121 is damaged by heat, and the supply of the current to the stepping motor 121 is interrupted.

Figure 10:
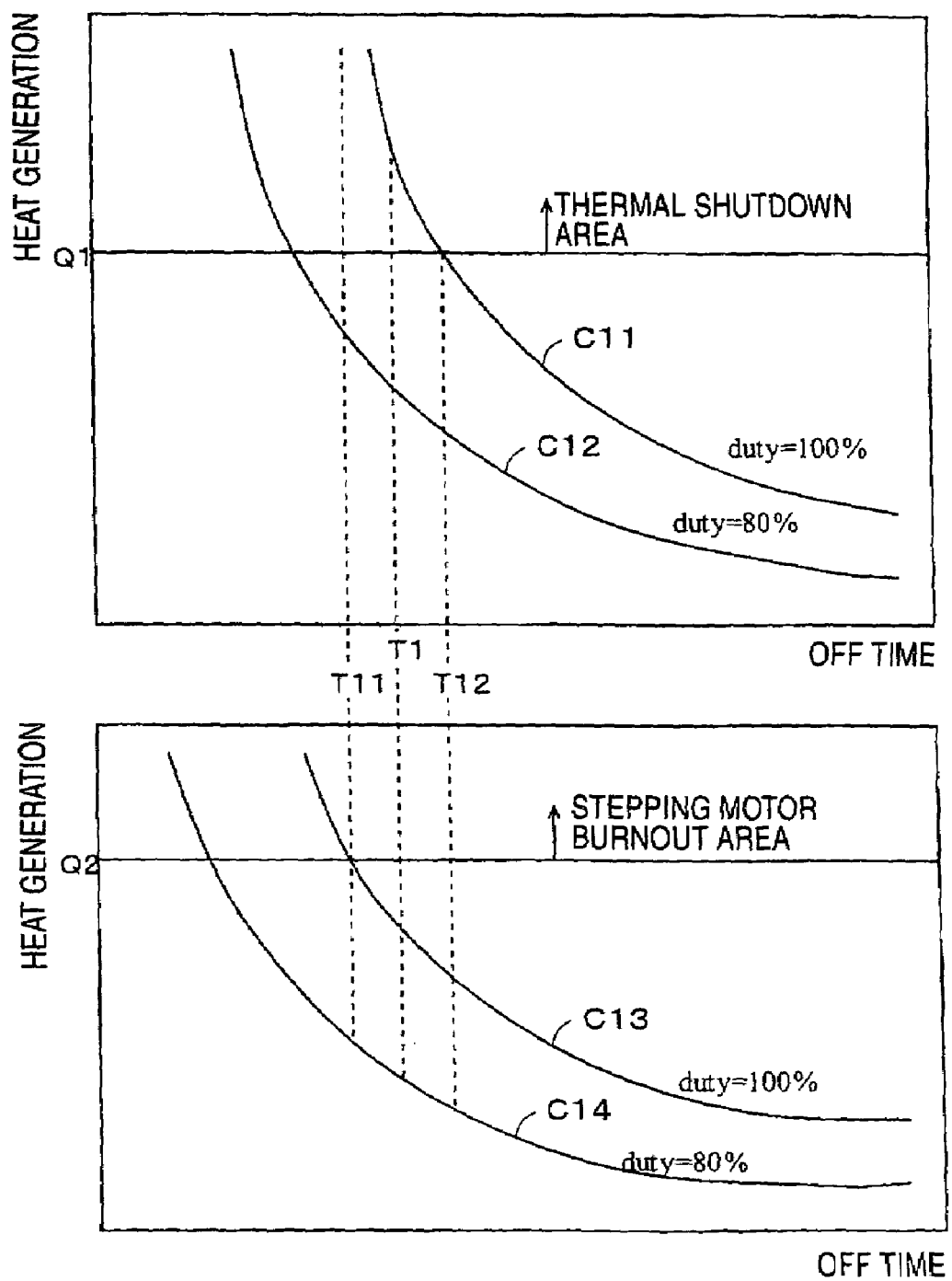
FIG. 10 is a view showing a relation between a heat generation amount and an off time.

FIG. 10 is a view showing a relation between the off time and the heat generation amount of the motor control circuit 120 and between the off time and the heat generation amount of the stepping motor 121 in the case where the decay is set to be the fast decay and the current set value is made 60%. FIG. 10A shows the relation between the off time and the heat generation amount of the motor control circuit 120, a curve C11 indicates the relation between the off time and the heat generation amount of the motor control circuit 120 in the case where duty is 100%, and a curve C12 indicates the relation between the off time and the heat generation amount of the motor control circuit 120 in the case where the duty is 80%. FIG. 10B shows the relation between the off time and the heat generation amount of the stepping motor 121, a curve C13 indicates the relation between the off time and the heat generation amount of the stepping motor 121 in the case where the duty is 100%, and a curve C14 indicates the relation between the off time and the heat generation amount of the stepping motor 121 in the case where the duty is 80%.

Here, the duty indicates an operating rate of the stepping motor 121 per a specified time. In the case where the duty is 100%, the operating rate in the case where the CPU 110 runs away is supposed. In the case where the duty is 80%, the maximum operating rate at a normal use time is supposed.

A stepping motor burnout area where the heat generation amount becomes Q2 or higher indicates an area where there is a possibility that the stepping motor 121 is burnt out by heat generation. A thermal shutdown area where the heat generation amount becomes Q1 or higher indicates an area where the thermal shutdown circuit 120c operates.

As shown in FIG. 10A, in the motor control circuit 120, when the off time becomes short, the switching frequency of the transistor becomes high, and therefore, the heat generation amount increases. When the heat generation amount becomes Q1 or higher, the thermal shutdown area is caused where the thermal shutdown circuit 120c operates. As shown in FIG. 10B, in the stepping motor 121, when the off time becomes short, the iron loss (especially eddy-current loss) is increased, and therefore, the heat generation amount is increased. When the heat generation amount becomes Q2 or higher, the stepping motor burnout area is caused where the stepping motor 121 is burnt out. In this embodiment, in such a case, a specified value between T11 and T12 is used as the off time. That is, when the off time is T11 or shorter, in the case where the duty is 100%, the heat generation amount of the stepping motor 121 exists in the stepping motor burnout area, and therefore, it is necessary that the off time is set to be T11 or longer. When the off time is T12 or longer, in the case where the duty is 100%, the motor control circuit 120 does not exist in the thermal shutdown area, and therefore, it is necessary that the off time is set to be T12 or shorter.

In the example of FIG. 10, T1 as the center value between T11 and T12 is used as the off time. When T1 as stated above is used as the off time, for example, in the case where the program runs away and the duty becomes 100%, the thermal shutdown circuit 120c operates, and the operation of the stepping motor 121 is stopped. On the other hand, in the case where the duty is 80% or lower (at the time of normal operation), since the heat generation amount does not fall within the thermal shutdown area, the thermal shutdown circuit 120c does not operate. Besides, as shown in FIG. 10B, in the case where the off time is T1, since the heat generation amount does not fall within the thermal shutdown area both in the case where the duty is 100% and in the case where the duty is 80%, it is possible to prevent the stepping motor 121 from being burnt out.

Accordingly, in the case shown in FIG. 10, when the off time is set to T1, even at the time of runaway, it is possible to prevent the stepping motor 121 from being burnt out, and the thermal shutdown circuit 120c operates to stop the supply of the electric power to the stepping motor 121, and therefore, it is possible to prevent the stepping motor 121 from being heated.

Figure 11:
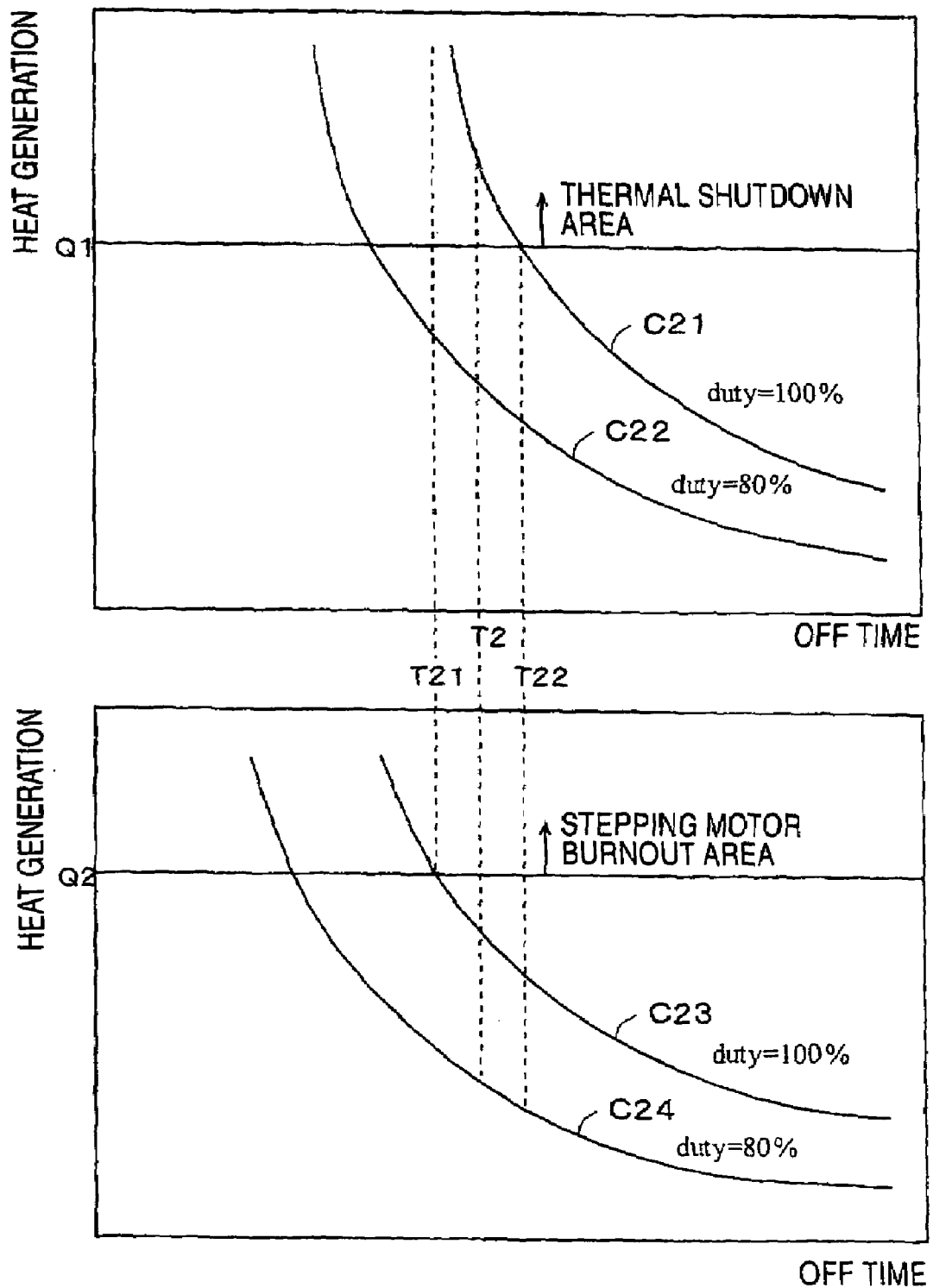
FIG. 11 is a view showing a relation between a heat generation amount and an off time.

FIG. 11 is a view showing a relation between the off time and the heat generation amount of the motor control circuit and between the off time and the heat generation amount of the stepping motor 121 in the case where the decay is set to be the fast decay and the current set value is made 100%. FIG. 11A shows the relation between the off time and the heat generation amount of the motor control circuit 120, a curve C21 indicates the relation between the off time and the heat generation amount of the motor control circuit 120 in the case where the duty is 100%, and a curve C22 indicates the relation between the off time and the heat generation amount of the motor control circuit 120 in the case where the duty is 80%. FIG. 11B shows the relation between the off time and the heat generation amount of the stepping motor 121, a curve C23 indicates the relation between the off time and the heat generation amount of the stepping motor 121 in the case where the duty is 100%, and a curve C24 indicates the relation between the off time and the heat generation amount of the stepping motor 121 in the case where the duty is 80%. When a comparison is made with the case of FIG. 10, although the decay is the fast decay in both the cases, the current set value is increased from 60% to 100%, and therefore, as the heat generaon amount is increased, the whole graph shifts to the right of the figure.

In the example of FIG. 11, T2 as the center value between T21 and T22 is used as the off time. When T2 as stated above is used as the off time, similarly to the forgoing case, for example, in the case where the program runs away and the duty becomes 100%, the thermal shutdown circuit 120c operates, and the operation of the stepping motor 121 is stopped. On the other hand, in the case where the duty is 80%, since the heat generation amount does not fall within the thermal shutdown area, the thermal shutdown circuit 120c does not operate. As shown in FIG. 11B, in the case where the off time is T2, since the heat generation amount does not fall within the stepping motor burnout area both in the case where the duty is 100% and in the case where the duty is 80%, it is possible to prevent the stepping motor from being burnt out.

Figure 12:
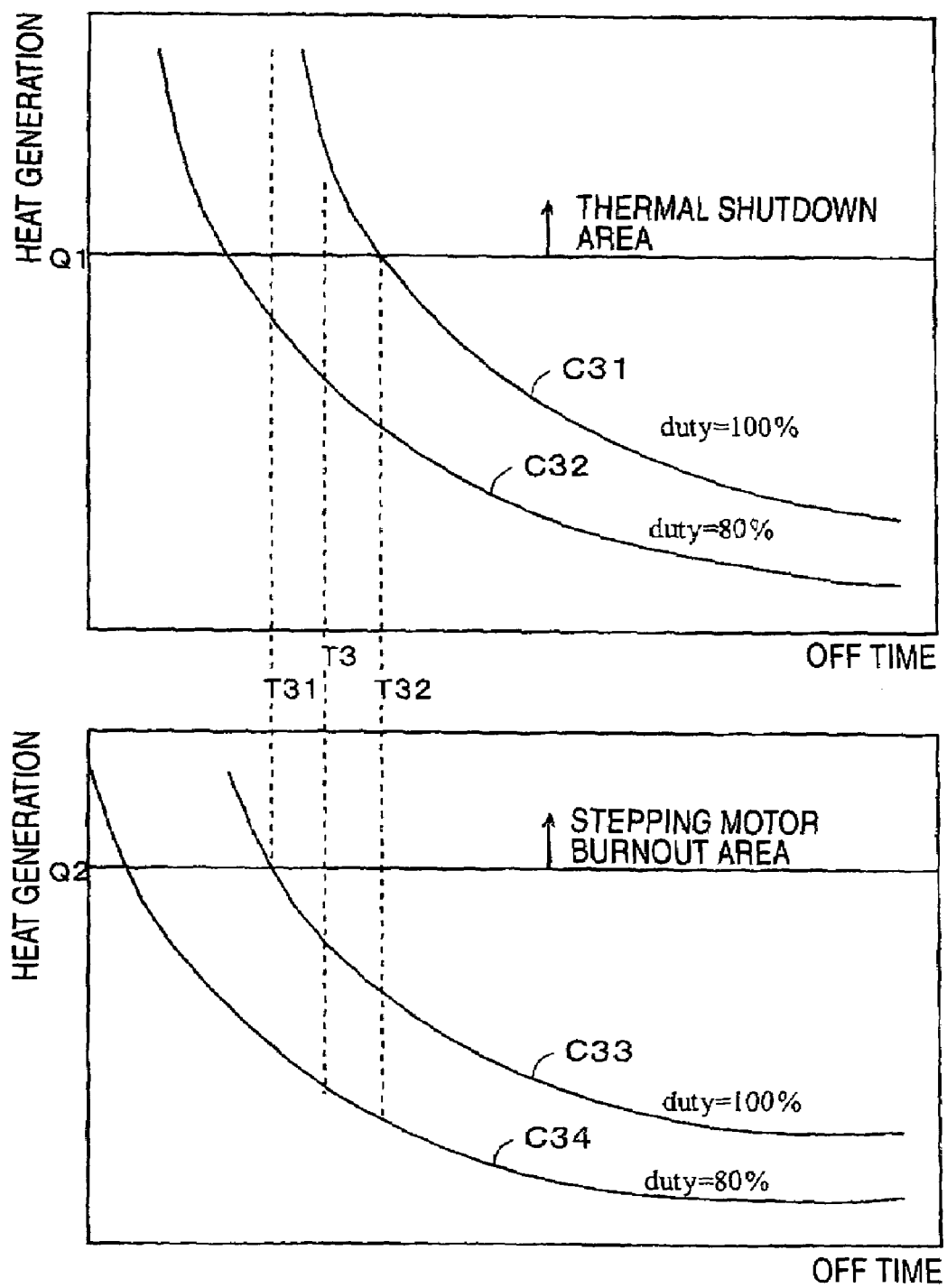
FIG. 12 is a view showing a relation between a heat generation amount and an off time.

FIG. 12 is a view showing a relation between the off time and the heat generation amount of the motor control circuit 120 and between the off time and the heat generation amount of the stepping motor 121 in the case where the decay is set to be the slow decay and the current set value is made 60%. FIG. 12A shows the relation between the off time and the heat generation amount of the motor control circuit 120, a curve C31 indicates the relation between the off time and the heat generation amount of the motor control circuit 120 in the case where the duty is 100%, and a curve C32 indicates the relation between the off time and the heat generation amount of the motor control circuit 120 in the case where the duty is 80%. FIG. 12B shows the relation between the off time and the heat generation amount of the stepping motor 121, a curve C33 indicates the relation between the off time and the heat generation amount of the stepping motor 121 in the case where the duty is 100%, and a curve C34 indicates the relation between the off time and the heat generation amount of the stepping motor 121 in the case where the duty is 80%. When a comparison is made with the case of FIG. 10, although both are the same in that the current set value is 60%, the decay is changed from the fast decay to the slow decay, and therefore, as the heat generation amount is decreased, the whole graph shifts to the left of the figure.

In the example of FIG. 12, T3 as a value between T31 and T32 is used as the off time. When T3 as stated above is used as the off time, similarly to the foregoing case, for example, in the case where the program runs away and the duty becomes 100%, the thermal shutdown circuit operates, and the operation of the stepping motor 121 is stopped. On the other hand, in the case where the duty is 80%, since the heat generation amount does not fall within the thermal shutdown area, the thermal shutdown circuit 120c does not operate. As shown in FIG. 12B, in the case where the off time is T3, since the heat generation amount does not fall within the stepping motor burnout area both in the case where the duty is 100% and in the case where the duty is 80%, it is possible to prevent the stepping motor 121 from being burnt out incidentally, T3, T1 and T2 have the relation of T2>T2>T3.

When the current set value, the decay, and the off time are set in the manner as stated above, the logic circuit 120a controls the drive circuit 120b based on the control data supplied from the CPU 110. The drive circuit 120b controls and rotates the stepping motor 121 according to the control of the logic circuit 120a. When the stepping motor 121 is rotated, the tube pump 30 connected to the motor is driven, and the cleaning process of the recording head 15 is performed.

During the cleaning process of the recording head 15, for example, in the case where the program stored in the ROM 111 runs away and there occurs such a state that electric power continues to be supplied to the stepping motor 121 from the drive circuit 120b (in the case where the duty becomes substantially 100%), as shown in FIGS. 10 to 12, irrespective of the setting of the current value and the decay, the thermal shutdown circuit 120c operates to stop the operation of the drive circuit 120b, and therefore, it is possible to prevent the stepping motor from being excessively heated. Besides, even in the case where the duty is 100%, since the stepping motor 121 does not fall within the stepping motor burnout area, it is possible to prevent the stepping motor 121 from being damaged by heat.

In the case where the thermal shutdown circuit 120c is operated, the CPU 110 supplies restart data to the thermal shutdown circuit 120c through the logic circuit 120a, so that resetting can be performed.

According to the above embodiment, the off time is set according to the kind of the decay and the current set value, and in the case of the abnormal operation where the duty is 100%, the thermal shutdown circuit 120c operates, and in the case of the normal operation where the duty is 80% or lower, the thermal shutdown circuit 120c does not operate. Thus, in the case where the abnormal operation occurs due to the runaway of the program or the like, the thermal shutdown circuit 120c operates, and the supply of electric power to the stepping motor 121 is stopped, and therefore, it is possible to prevent the stepping motor 121 from being heated. Besides, even in the case where the duty is 100%, the heat generation amount is made not to fall within the stepping motor burnout area, and therefore, it is possible to prevent the stepping motor 121 from being burnt out.

Incidentally, the above embodiment is an example, and there are various modified examples in addition to this. For example, in the above embodiment, although the center value between T11 and T12, between T21 and T22, or between T31 and T32 is set as the off time, a value other than the center value can also be set.

Besides, in the above embodiment, in the case where the duty is 100%, the off time is selected so that the heat generation amount does not fall within the stepping motor burnout area. However, if the thermal shutdown circuit 120c certainly operates before the stepping motor is burnt out, the heat generation amount may fall within the stepping motor burnout area. Specifically, for example, in FIG. 10, the off time may be set in an area not higher than T11. Besides, since it is conceivable that the stepping motor burnout area and the thermal shutdown area are changed according to the environmental change and the individual difference, in order to cope with such a case, for example, in the example of FIG. 10, the off time can also be set in an area not lower than T12. Incidentally, in such a case, although the stepping motor 121 continues the operation state, since the heat generation amount does not fall within the stepping motor burnout area, the stepping motor 121 is not burnt out.

Besides, although the above embodiment has been described while the stepping motor 121 to drive the tube pump 30 is used as an example, the invention can also be applied to the stepping motor used for purposes other than this.

Besides, although the above embodiment has been described while the stepping motor 121 is used as an example, the invention can be applied to, for example, a DC motor.

Figure 13:
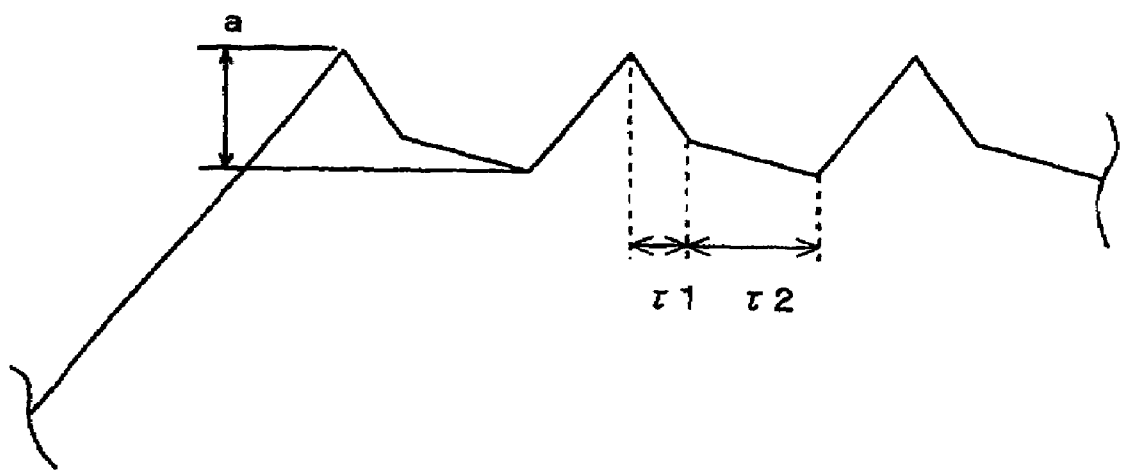
FIG. 13 is a view showing an output current waveform in a mixed decay.

Besides, although the above embodiment has been described while the fast decay and the slow decay are used as examples, the invention can be applied to, for example, the mixed decay in which these are combined. FIG. 13 is a view showing a current waveform in the mixed decay. As shown in this figure, in the mixed decay, when a current value reaches an instruction value, first, the current is abruptly decreased by the fast decay, and subsequently, the current is gradually decreased by the slow decay. In this case, the total time (τ1+τ2) of a time τ1 of a portion corresponding to the fast decay and a time τ2 of a portion corresponding to the slow decay is set as the off time. Incidentally, only τ1 or τ2 may be set as the off time.

Besides, in the above embodiment, although the duty at the time of normal operation is made 80% or lower, it may be set to a value other than this. For example, the duty can also be made 90% or lower, or 70% or lower.

Besides, the above embodiment has been described while using, as an example, as shown in FIGS. 10 to 12, the case where the curve indicating the relation between the off time and the heat generation amount of the motor control circuit 120 is positioned at the right side of the curve indicating the relation between the off time and the heat generation amount of the stepping motor 121. However, in the case where the curve indicating the relation between the off time and the heat generation amount of the motor control circuit 120 is positioned at the left side of the curve indicating the relation between the off time and the heat generation amount of the stepping motor 121, even in the case where the heat generation amount is positioned in the stepping motor burnout area, there is a case where the heat generation amount does not fall within the thermal shutdown area. In such a case, the capacity of the stepping motor is made large, or a member (for example, cooling fin) for cooling is attached to the stepping motor in order to improve the heat radiation characteristic, and in the case where the heat generation amount is positioned at least in the stepping motor burnout area, the heat generation amount is made to fall within the thermal shutdown area.

Besides, in the above embodiment, although the two-phase stepping motor 121 is used, a one-phase or a three- or more phase stepping motor can also be used.

Besides, in the embodiment, although the CPU 110 generates the control signal, and the logic circuit 120*a* receives this and drives the drive circuit 120*b*, the sharing of roles is not limited to the case as stated above. For example, the logic circuit 120*a* can substitutes for the function of the CPU 110.

Besides, in the embodiment, although the stepping motor burnout area and the thermal shutdown area are fixed, it is conceivable that these are changed by the heat radiation characteristic or environmental temperature. Thus, for example, the environmental temperature is detected by a sensor, these areas are redefined according to the detected result, and the off time may be set according to the redefined areas. According to such an example, it is possible to provide a stepping motor control apparatus which hardly receive the influence of the environmental temperature or the like.

Incidentally, the above processing function can be realized by a computer. In that case, there is provided a program describing the processing content of the function which the stepping motor drive apparatus should have. The computer executes the program, so that the above processing function is realized on the computer. The program describing the processing content can be recorded on a computer readable recording medium. The computer readable recording medium includes a magnetic recording device, an optical disk, a magneto-optical recording medium, a semiconductor memory, etc. The magnetic recording device includes a hard disk device (HDD), a flexible disk (FD), a magnetic tape, etc. The optical disk includes a DVD (Digital Versatile Disk), a DVD-RAM, a CD-ROM (Compact Disk ROM), a CD-R (Recordable)/RW (ReWritable), etc. The magneto-optical recording medium includes MO (Magneto-Optical disk), etc.

In the case where the program is put into circulation, a portable recording medium, such as, for example, a DVD or a CD-ROM on which the program is recorded, is sold. Besides, the program is stored in a storage device of a server computer, and the program can be transferred from the server computer to another computer trough a network.

The computer to execute the program stores, for example, the program recorded on the portable recording medium or the program transferred from the server computer into its own storage device. The computer reads the program from its own storage device, and executes the processing in accordance with the program. Incidentally, the computer directly reads the program from the portable recording medium, and can execute the processing in accordance with the program. Besides, the computer can perform the processing in accordance with the received program each time the program is transferred from the server computer.

What is claimed is:

1. A stepping motor control apparatus comprising:
   a control circuit that controls sequence of excitation of a stepping motor;
   a switching circuit that switches electric power to be supplied to the stepping motor based on an instruction from the control circuit; and
   a stop circuit that stops an operation of the switching circuit when temperature of the switching circuit becomes a specified temperature or higher,
   wherein the control circuit controls the switching circuit such that the stop circuit operates before the stepping motor is damaged by heat.

2. The stepping motor control apparatus according to claim 1, wherein the control circuit adjusts an off time in which a switch constituting the switching circuit keeps an off state, and thereby the control circuit controls the switching circuit.

3. The stepping motor control apparatus according to claim 2, wherein the control circuit adjusts the off time in accordance with a set value of current to be outputted to the stepping motor.

4. The stepping motor control apparatus according to claim 2, wherein the control circuit adjusts the off time in accordance with a kind of decay of the switching circuit.

5. A stepping motor control method for a stepping motor control apparatus including: a control circuit that controls sequence of excitation of a stepping motor; a switching circuit that switches electric power to be supplied to the stepping motor based on an instruction from the control circuit; and a stop circuit that stops an operation of the switching circuit when temperature of the switching circuit becomes a specified temperature or higher, the method comprising:
   receiving a control signal for controlling the stopping motor; and
   controlling the switching circuit by the control circuit so that the stop circuit operates before the stepping motor is damaged by heat.

6. The stepping motor control method according to claim 5, wherein the controlling the switching circuit comprising:
   adjusting an off time in which a switch constituting the switching circuit keeps an off state.

7. The stepping motor control method according to claim 6, wherein the off time is adjusted in accordance with a set value of current to be outputted to the stepping motor.

8. The stepping motor control method according to claim 6, wherein the off time is adjusted in accordance with a kind of decay of the switching circuit.

9. A program product executed in a computer, including a set of instructions for controlling a stepping motor control apparatus including:
   a control circuit that controls sequence of excitation of a stepping motor;
   a switching circuit that switches electric power to be supplied to the stepping motor based on an instruction from the control circuit; and a stop circuit that stops an operation of the switching circuit when temperature of the switching circuit becomes a specified temperature or higher, the set of instructions comprising:
      receiving a control signal for controlling the stepping motor; and
      controlling the switching circuit by the control circuit so that the stop circuit operates before the stepping motor is damaged by heat.

10. The program product according to claim 9, wherein the controlling the switching circuit comprising:
    adjusting an off time in which a switch constituting the switching circuit keeps an off state.

11. The program product according to claim 10, wherein the off time is adjusted in accordance with a set value of current to be outputted to the stepping motor.

12. The program product according to claim 10, wherein the off time is adjusted in accordance with a kind of decay of the switching circuit.

13. A stepping motor control apparatus comprising:
    a control circuit that controls sequence of excitation of a stepping motor;
    a switching circuit that switches electric power to be supplied to the stepping motor based on an instruction from the control circuit; and
    a stop circuit that stops an operation of the switching circuit when temperature of the switching circuit becomes a specified temperature or higher,
    wherein the control circuit controls an off time in which a switch constituting the switching circuit keeps an off state between a first time in which the stepping motor is not damaged by heat at a specified duty and a second time in which the stop circuit operates at the specified duty.

14. The stepping motor control apparatus according to claim 13, wherein the specified duty is 100%.

15. A stepping motor control apparatus comprising:
    a control circuit that controls sequence of excitation of a stepping motor; and
    a switching circuit that switches electric power to be supplied to the stepping motor based on an instruction from the control circuit,
    wherein the control circuit, when the switching circuit becomes a predetermined temperature or higher, prolongs an off time in which a switch constituting the switching circuit keeps an off state.

* * * * *